March 22, 1932.  G. T. MARKEY ET AL  1,850,351
BROODING CABINET
Filed Feb. 27, 1930  2 Sheets-Sheet 1
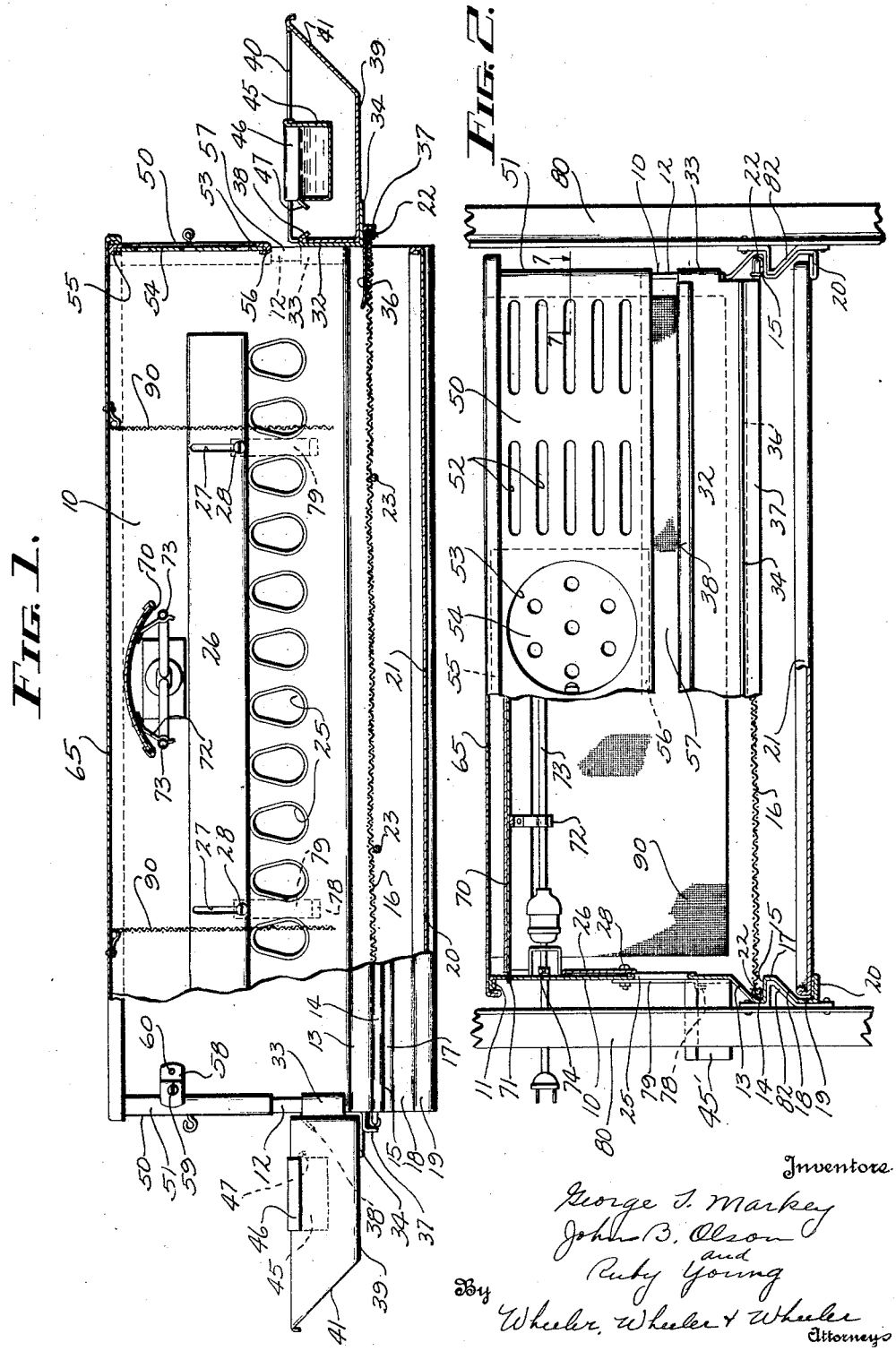
Inventors
George T. Markey
John B. Olson
and
Ruby Young
By Wheeler, Wheeler & Wheeler
Attorneys March 22, 1932. G. T. MARKEY ET AL 1,850,351
BROODING CABINET
Filed Feb. 27, 1930 2 Sheets-Sheet 2
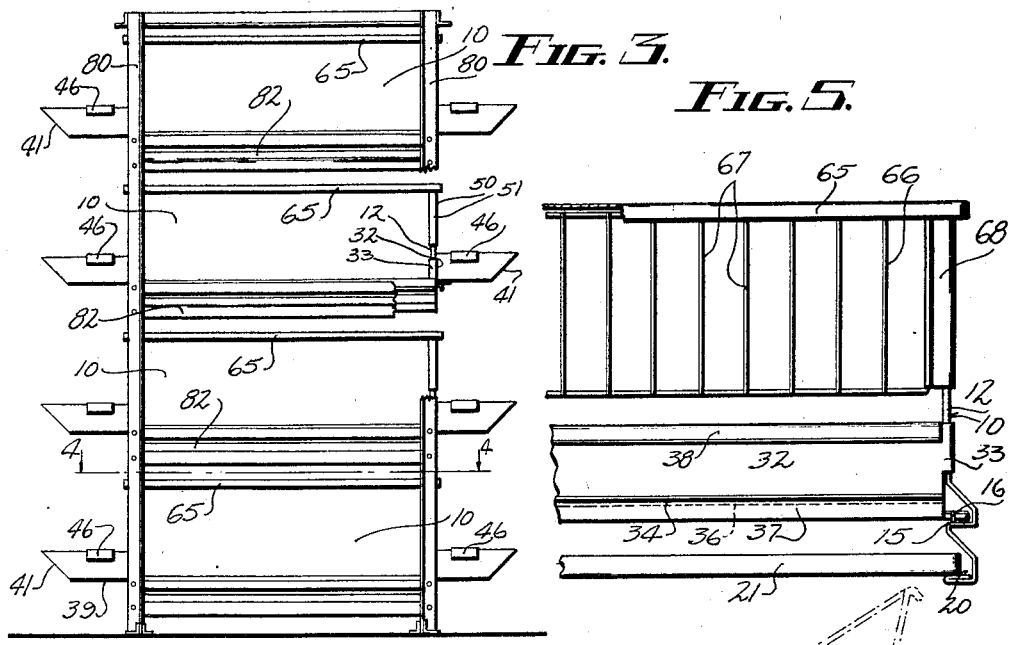
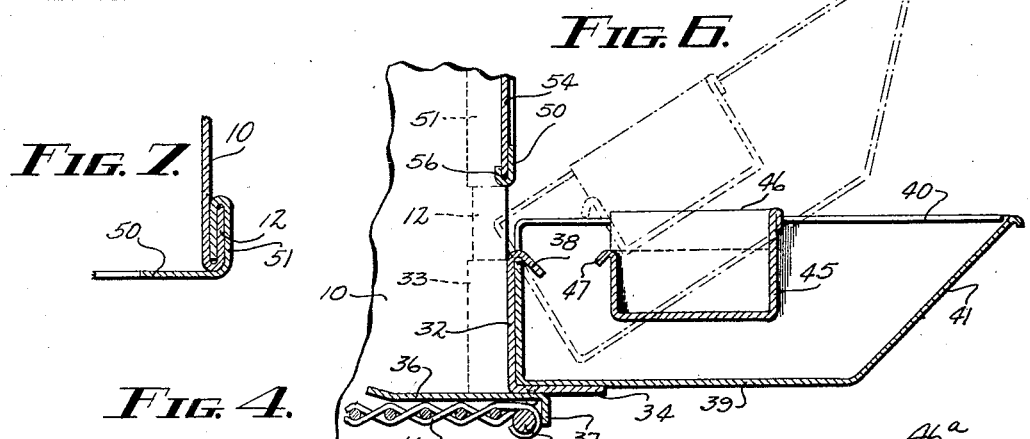
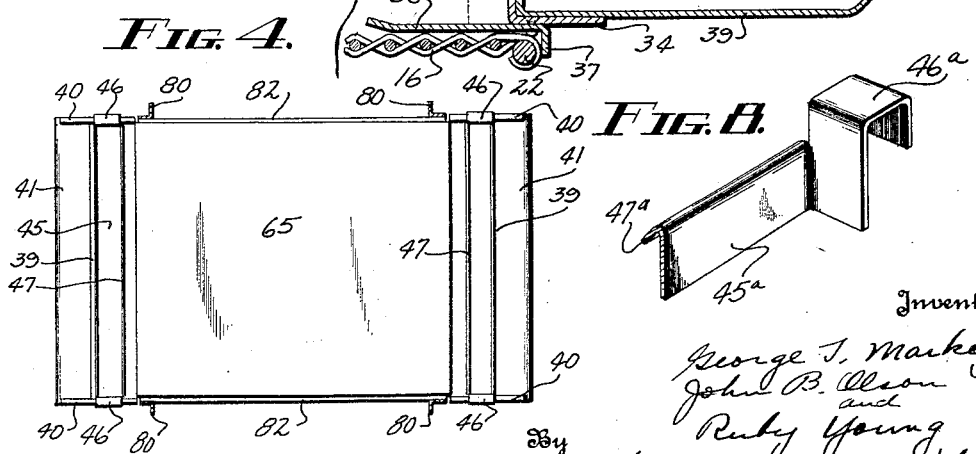

Patented Mar. 22, 1932

1,850,351

UNITED STATES PATENT OFFICE

GEORGE T. MARKEY, JOHN B. OLSON, AND RUBY YOUNG, OF FORT ATKINSON, WISCONSIN, ASSIGNORS TO JAMES MANUFACTURING COMPANY, OF FORT ATKINSON, WISCONSIN

BROODING CABINET

Application filed February 27, 1930. Serial No. 431,639.

Our invention relates to improvements in brooding cabinets of the type commonly known as fattening batteries when used for confining fowls while being fattened for market. The improved cabinets may also be employed for housing young chickens or other birds whenever segregation in small flocks is desired.

In general, the object of this invention is to provide means whereby fowls may be confined under sanitary conditions promotive of health and growth from the time of hatching to the time when they are conditioned for market or for any other periods, and to facilitate feeding and watering the fowls in a manner to eliminate waste and protect the water and the feed from contamination.

Further objects are to provide cabinets which may be conveniently mounted in tiers, one above another in a rectangular frame, for use in housing birds for storage purposes or for transportation, the structure being such that large numbers of birds may be housed, fed, and watered with minimum space requirements, maximum comfort for the birds, and promote maximum convenience for the attendants whose duty it is to feed and water the birds and see that proper temperature and proper sanitation are maintained.

A further object is to provide a cabinet composed of standardized parts adapted for quantity production with a minimum number of operations and capable of being assembled in interlocking relation to each other, whereby riveting may be dispensed with or the number of required bolts or other fastenings reduced to a minimum, thereby also minimizing the cost of assembly and making it possible to ship the cabinets in knock-down form, assemble them at the point of use, and again take them apart for shipment or storage as often as may be desired.

In the drawings:

Figure 1 is a side view, partly in elevation and partly in vertical section, of one of the brooding cabinets.

Figure 2 is an end view of the same, showing also the posts of a frame for supporting such cabinets.

Figure 3 is an elevation showing a series of cabinets supported in the frame, one of the frame posts being partially broken away.

Figure 4 is a section taken on line 4—4 of Figure 3.

Figure 5 is a fragmentary elevational view similar to Figure 2, but illustrating an interchangeable grid like wall section in place.

Figure 6 is an enlarged fragmentary view in vertical section showing the feed and watering troughs and associated parts, with dotted lines indicating how the feed trough is manipulated into position.

Figure 7 is a sectional view taken on line 7—7 of Figure 2.

Figure 8 is a fragmentary view showing a modified anti-scatter guard.

Like parts are identified by the same reference characters throughout the several views.

The improved cabinet is preferably rectangular in form and almost wholly composed of sheet metal stampings which may be pressed into the desired shape with a minimum number of operations. These stampings are also of such form that they may be easily and quickly assembled and secured in position by inexperienced persons.

The side walls 10 are outwardly turned along their upper margins and folded to form reinforced flanges 11 upon which a top wall or plate may rest, as hereinafter explained. The end margins of the walls 10 are also folded for reinforcing purposes and in a manner to provide exterior ribs 12 which facilitate sliding the end walls into interlocking relation to the side walls, as hereinafter explained.

Along the lower margin of each side wall, a portion 13 extends obliquely outwardly, then vertically downwardly at 14 and horizontally inwardly to form a channel having an interior shelf 15 to support a floor 16. The opposing side wall is, of course, reversed and forms a corresponding shelf at its inner side to support the opposite margin of the floor 16.

Below the floor 16 the side wall has another vertically extending portion 17, substantially in the vertical plane of its upper portion, and the wall is then again outwardly, downwardly, and inwardly pressed to form the oblique portion 18, the outwardly vertically offset portion 19, and an inturned bottom flange or shelf 20 which receives and supports a pan or dropping board 21. The offset vertical portions 14 and 19 are preferably substantially in the same plane and the spaces above the shelves 15 and 20 constitute channels or slideways whereby either the floor 16 or the pan 21 may be withdrawn longitudinally. These channels being formed by outwardly offsetting the sheet metal of the side walls, it is obvious that the side margins of the floor and pan will be protected and kept clean by the overhanging walls 13 and 18. The floor 16 is foraminous and is preferably formed of woven or interlaced wire, the margins of which are secured to a heavy wire frame or rectangularly bent rod 22, reinforced, if desired, by cross rods 23.

At least one of the side walls is preferably provided with a lineally arranged series of oval shaped or egg shaped openings 25, through which the heads of the birds may pass. A slide 26 having vertical slots 27 is connected with the side wall immediately above the line of openings 25 by bolts 28 which extend through said slots 27, whereby the slide 26 may be vertically adjusted and clamped by the bolts 28 in the desired position of adjustment. The slide may thus be moved downwardly to progressively cover the openings 25 or to close them entirely if desired.

At one end,—preferably at both ends,—and near the floor 16, the side walls 10 are connected with each other by a strip of sheet metal 32 which forms the lower portion of an end wall and has hook shaped end margins 33 conforming generally to the contour of the ribs 12, i. e., with the folded end margins of the side walls 10. The hook shaped flanges 33 of the wall strips 32 slidingly engage the ribs 12, whereby the end wall strips 32 may be moved downwardly from the top until the interlocking hook members 33 bear upon the oblique portions 13 of the side walls. The strips 32 are wider than the hooks or interlocking portions 33 and extend below them substantially to the level of the floor and are then out-turned to form a feed trough shelf 34. If desired, a sill plate 36 may be secured to the under surface of the shelf 34 and its front margin provided with a downturned flange 37 which overhangs the associated margin of the floor.

The upper margin of the wall member 32 is outwardly and downwardly turned in an oblique plane to form a feed trough retaining flange 38 adapted to engage over the upper margin of the inner wall of a feed trough 39. The feed troughs 39 preferably have flat bottoms which rest upon the shelf 34 along their inner margins. The inner wall of the trough engages underneath the retaining flange 38, this feed trough wall being preferably of less height than either the end walls or the outer wall of the trough. The end walls are preferably formed with in-turned flanges 40 and the outer wall 41 is preferably inclined to facilitate cleaning the trough.

A watering trough 45 has end walls provided with hook shaped flanges 46 along their upper margins formed by bending the sheet metal outwardly and preferably downwardly along the outer margin, whereby the water trough may be supported from the flanged end walls of the feed trough. The water trough is free to slide toward or away from the housing along the end walls of the feed trough. The upper marginal portion 47 of the inner wall of the watering trough is obliquely down-turned in the direction of the feed trough retaining flange 38 on the wall strip 32 of the housing, whereby these two flanges 38 and 47 may cooperate as anti-scatter guards to effectually prevent the fowls from scattering their food by throwing it out of the trough. The purpose of having the water trough adjustable toward and away from the housing is to regulate the distance between the lower margins of these anti-scatter guards in conformity with the requirements of the fowls. The space between the guards must be wide enough to allow the fowls to insert their heads into the feed trough, but it need be no wider than necessary for that purpose since the effectiveness of the guard is quite largely dependent upon their proximity to each other.

If it is not desired to have a water trough over the feed trough, a strip 45a having hook flanges 46a (Fig. 8), may be substituted. The strip 45a carries a flange 47a which corresponds with the guard 47 on the water trough 45.

Interchangeable end wall sections are provided for the space above the end wall members 32. One of these interchangeable sections comprises a strip of sheet metal 50 having hook shaped end flanges 51 to slidingly engage the ribs 12 and having series of horizontal slots 52 flanking a central opening 53 which is normally closed by a slide 54 loosely engaged by flanged upper and lower margins 55 and 56 respectively.

The wall section 50 is employed when the cabinet is being used for housing small fowls or other small birds. Its lower margin is spaced from the upper margin of the wall member 32 sufficiently to allow these small fowls to have access to the feed and water troughs, the section 50 being so adjusted as to prevent the fowls from escaping while allowing them to put their heads and necks through the elongated opening 57 extending across each end of the cabinet immediately above the scatter guard 33. The section 50 may be clamped in the desired position of adjustment by sheet metal clamping clips 58 and clamping bolts 59 which pass through the side walls 10 of the cabinet.

If desired, the clamping clips or plates 58 may be formed of resilient material having offset portions through which the bolts pass and other portions connected by rivet 60 with the associated side walls.

When the cabinet is to be used for larger fowls for which the feed opening 57 would be inconveniently low and narrow, the wall section 50 may be removed by loosening the clamping bolts 59, removing the top 65, and sliding the section 50 vertically until its end flanges are released from the ribs 12 on the side walls. Thereupon, a wall section may be substituted which is composed of an open frame 66, the top and bottom members of which are connected at intervals by vertical bars 67. The ends of this frame 66 have sheet metal extensions 68 corresponding generally with the form of the interlocking end flanges 51 of the wall section 50, whereby the grid-like wall section composed of a frame 66 and vertical bars 67 may be substituted and attached to the side walls of the cabinet in the same manner that the wall section 50 is attached.

The top 65 of the cabinet is composed of a flat sheet metal plate having down-turned marginal flanges which fit over the vertical side and end walls of the cabinet. Immediately underneath the top and extending transversely of its central portion, a sheet metal cross bar 70 is mounted which is cylindrically curved and provided with supporting end clips 71 which extend through slots in the side wall 10 to support the bar. This bar is provided with spring clips 72 on its underside which support an electrical heater 73 controlled by a thermostat 74. The bar 70 partially houses the electric heater and deflects the air currents toward the front and rear to distribute the heat.

At the side of the cabinet which is provided with the egg shaped openings 25, a similar water trough 45, preferably without a guard 47, and may be secured with its inner margin resting upon the oblique wall portion 13 and its upper margin engaged by down-turned lips 78 on L shaped brackets 79 secured to the side walls between the openings 25. These water troughs and also the feed troughs 38 may be manipulated into position by tilting them until their inner margins can be engaged under the lips 78 in the case of the side water trough or under the scatter guard 38 in the case of the feed trough, after which these troughs are swung downwardly to their normal horizontal positions and supported as above described.

The above described cabinets may be supported one above another in tiers between the corner posts 80 of a frame of any convenient height, the corner posts being provided with sheet metal shelf rails 82 at suitable intervals for engagement underneath the shelves 15 of the side walls of the respective cabinets, as clearly shown in Figure 2. The upper and lower margins of the sheet metal members composing the shelf rails are bolted or riveted to the corner posts and operate in pairs for independent support of the individual cabinets. They are preferably so spaced that each cabinet will be slightly separated from the others.

Curtains 90, preferably composed of fabric, are secured to the top in front and at the rear of the heater to provide a warm air hovering space in the central portion of the cabinet.

We claim:

1. A brooding cabinet having sheet metal side walls reversely bent to form outwardly offset runways at different levels near their lower margins, in combination with a foraminous floor adapted to slide in the upper runways, and a droppings pan adapted to slide in the lower runways.

2. A brooding cabinet having sheet metal side walls each provided with a plurality of horizontally extending portions outwardly offset near their lower margins to form channels overhung by the upper portions of the offset walls and adapted to serve as runways at different levels, in combination with a foraminous floor adapted to slide in the upper runways, and a droppings pan adapted to slide in the lower runways, said cabinet having an end wall member provided with a sill plate normally overhanging the end margins of the floor and pan.

3. A brooding cabinet having sheet metal side walls each provided with a plurality of outwardly offset horizontally extending portions outwardly offset near their lower margins forming overhung runways at different levels, in combination with a foraminous floor adapted to slide in the upper runways, and a droppings pan adapted to slide in the lower runways, said cabinet having an end wall member provided with a sill plate normally overhanging the end margins of the floor and pan, and also having an exterior shelf like support for a feed pan, and an oblique anti-scatter guard adapted to overhang the inner margin of a feeding pan to hold the pan on said support.

4. A brooding cabinet having exterior feed and water troughs extending respectively along one end and along one side, said troughs being detachably interlocked with and supported from the cabinet walls, and said walls having openings affording feeding access to the troughs.

5. A brooding cabinet having an exterior feed trough and feed openings in the cabinet wall allowing access to the feed trough in combination with a superposed water trough, having its ends mounted to slide on the ends of the feed trough to vary the width of the feeding space between the water trough and the inner margin of the feed trough.

6. In combination with a cabinet for fowls and other birds, a feed trough having an obliquely disposed anti-scatter guard along its feeding margin and an oppositely pitched co-operating guard supported over the trough in a position to limit the width of the feeding opening.

7. A cabinet for fowls and other birds having a foraminous floor slide and a droppings pan therebeneath, the walls of said cabinet having covering members for all margins of the floor and pan to protect such margins, when in normal position, from becoming fouled by the birds in the cabinet.

8. A cabinet for fowls and other birds having side wall members provided with vertical end ribs, and sets of end wall members formed for sliding interlocking engagement with said ribs, one of said end wall members having a flanged upper margin adapted to engage an exterior feed pan and a sill like lower margin, adapted to co-operatively support such feed pan.

9. A cabinet battery for fowls and other birds, comprising the combination with a frame having vertical posts connected at the sides of the frame by shelf like rails at intervals, of a set of cabinets having flat tops, and offset side portions adapted to engage and slide upon said rails.

10. A cabinet battery for fowls and other birds, comprising the combination with a frame having vertical posts connected at the sides of the frame by shelf like rails at intervals, of a set of cabinets having flat tops, and offset side portions adapted to engage and slide upon said rails, said rails being positioned to support the cabinets in spaced relation to each other, and the ends of the cabinets being provided with feed troughs accessible to the fowls in the cabinets and receivable between the end posts of the frame.

11. A brooding cabinet, having an end wall composed of members having margins separated to provide feeding openings, and an interchangeable grid adapted to be substituted for the upper wall member and provided with vertical slot like feed openings.

12. A feed trough for fowls and other birds having a superposed adjustable wall provided with an obliquely down-turned margin adapted to serve as an anti-scatter guard, and an opposing similar guard overhanging the wall of the trough on the feeding side.

13. A feed trough for fowls and other birds having a superposed adjustable wall provided with an obliquely down-turned upper margin adapted to serve as an anti-scatter guard, and an opposing similar guard overhanging the wall of the trough on the feeding side, and a watering trough associated with the adjustable wall.

14. In a brooding cabinet, a wall member having an oblique top flange over which fowls may have access to food, and also having a bottom flange adapted to co-operate with the top flange to support a feeding receptacle.

15. In a brooding cabinet, a wall member having feeding apertures and offset portions below the apertures, of a set of clips secured to the wall member adjacent the apertures and provided with offset interlocking lips adapted to hold a water trough in engagement with said offset portions of the wall.

16. In a brooding cabinet, a wall member having feeding apertures and offset portions below the apertures, of a set of clips secured to the wall member adjacent the apertures and provided with offset interlocking lips adapted to hold a water trough in engagement with said offset portions of the wall, said offset portions being provided with interior floor supporting shelf portions.

GEORGE T. MARKEY.
JOHN B. OLSON.
RUBY YOUNG.